US009325363B2

(12) United States Patent
Ferraro

(10) Patent No.: US 9,325,363 B2
(45) Date of Patent: Apr. 26, 2016

(54) WEATHERPROOF BULKHEAD MOUNT

(71) Applicant: Ericsson Inc., Plano, TX (US)

(72) Inventor: Anthony Ferraro, North Reading, MA (US)

(73) Assignee: ERICSSON INC., Plano, TX (US)

(*) Notice: Subject to any disclaimer, the term of this patent is extended or adjusted under 35 U.S.C. 154(b) by 101 days.

(21) Appl. No.: 14/159,148

(22) Filed: Jan. 20, 2014

(65) Prior Publication Data
US 2015/0207533 A1 Jul. 23, 2015

(51) Int. Cl.
H01R 13/52 (2006.01)
H04B 1/3816 (2015.01)
H01R 24/64 (2011.01)
H02G 3/08 (2006.01)
H04B 1/38 (2015.01)
H01R 12/72 (2011.01)

(52) U.S. Cl.
CPC .......... *H04B 1/3816* (2013.01); *H01R 13/5213* (2013.01); *H01R 24/64* (2013.01); *H02G 3/088* (2013.01); *H01R 12/722* (2013.01); *H04B 2001/3894* (2013.01)

(58) Field of Classification Search
CPC ..................................................... H04B 1/3816
See application file for complete search history.

(56) References Cited

U.S. PATENT DOCUMENTS

| 5,230,536 A * | 7/1993 | Rider ........................ F16L 5/06 285/136.1 |
| 6,152,770 A * | 11/2000 | Wang ................... H01R 13/506 439/598 |
| 6,190,207 B1 * | 2/2001 | Wang ...................... H01R 13/52 439/620.31 |
| 7,794,283 B2 * | 9/2010 | Wang ................... H01R 13/447 439/651 |
| 2004/0242067 A1 * | 12/2004 | Oyamada ............. H01R 13/502 439/587 |
| 2005/0153591 A1 | 7/2005 | Milner et al. |
| 2006/0089049 A1 | 4/2006 | Sedor |
| 2007/0036489 A1 | 2/2007 | Grzegorzewska et al. |
| 2009/0163058 A1 | 6/2009 | Craig et al. |
| 2013/0109210 A1 * | 5/2013 | Zhang ................. H01R 13/6275 439/271 |
| 2014/0256166 A1 * | 9/2014 | Ramos ............... H01R 13/5221 439/271 |
| 2014/0335704 A1 * | 11/2014 | Chiu ................... H01R 12/7088 439/78 |
| 2014/0335803 A1 * | 11/2014 | Rivera ...................... H04B 1/38 455/90.3 |
| 2015/0171542 A1 * | 6/2015 | Pietila .................. H01R 13/447 439/135 |

FOREIGN PATENT DOCUMENTS

WO WO 2010/028738 3/2010

* cited by examiner

Primary Examiner — Bobbak Safaipour

(57) ABSTRACT

Disclosed is a weatherproof bulkhead mount that includes a weatherproof bulkhead housing having a portion sized to pass through a surface of a waterproof, sealed enclosure to an inside space of the enclosure and a portion sized to remain on the surface. The mount has a connector in the housing that provides electrical connection for an active component and is accessible from the outdoor environment, a circuit board in electrical connection with the connector for providing electrical communication between the connector and the inside space, and a removable cap to provide access to the connector when removed and to provide a weatherproof seal for the connector when not removed. Preferably, the "active" component socket is a SIM socket. Preferably, the cap has a push/pull grip, an elastic tether and a tether retaining ring. The tether retaining ring can also function as a weatherproof bulkhead gasket against the weatherproof bulkhead.

1 Claim, 4 Drawing Sheets

WEATHERPROOF BULKHEAD MOUNT

BACKGROUND OF THE DISCLOSURE

1. Field of the Disclosure

The present disclosure relates to weatherproof bulkhead mounts used for communication equipment that is located in an outdoor environment and/or exposed to environmental conditions.

2. Description of the Background Art

Weatherproof bulkhead mounts used in the communications industry for communication equipment located in outdoor environments are generally known. Such weatherproof bulkhead mounts generally include sockets providing connections to the inside of a weatherproof, sealed enclosure. These sockets are used for, inter alia, pre-shipment testing of the communications equipment and/or for updating software stored and used in the communications equipment. However, once the communication equipment(s) is installed in the field, the sockets are rarely, if ever, used. Such sockets can be considered "inactive" (or "dumb") components in the sense that the sockets must be connected to other equipment to effect the purpose for which they have been installed. Such sockets do not actively participate in the function of the communications equipment once the equipment is installed in the field.

Because the sockets are generally not used once the communications equipment has been installed in the field, the cover for the weatherproof bulkhead mount containing the sockets generally does not have a cover that provides for ease of opening and closing of the weatherproof bulkhead mount. This is especially true given the bulky, electrically-protective clothing worn by workers when installing or repairing the communications equipment, especially gloves. In particular, the clothes worn by workers when installing or repairing the communications equipment do not provide for a great deal of "fine motor" ability.

Stationary or fixed location communication equipment that contains a cellular network modem may require a Subscriber Identity Module card (i.e., a SIM card). The socket for this replaceable card is usually located inside of the weatherproof, sealed enclosure. The enclosure is provided as a weatherproof and sealed enclosure so as to meet the requirements of reference standards, such as NEMA 4 or IP 67 standards.

The location of the SIM card inside the weatherproof, sealed enclosure presents some problems. First, a cellular modem is required to be activated on a cellular network at, or prior to, the time of manufacture but, in any event, prior to shipping and installation of the weatherproof, sealed enclosure. This limits flexibility in the manufacture and/or delivery of the weatherproof, sealed enclosure to the customer(s). Second, if the customer chooses a particular cellular network carrier or decides to change the cellular network carrier, this requires the disassembly of the weatherproof, sealed enclosure to replace an internally located SIM card. This can be time-consuming, as well as potentially compromising the ability of the enclosure to meet the reference, such NEMA 4 and IP 67 standards once re-assembled.

Thus, a need exists to provide greater flexibility, for both the manufacturer and customer(s) of the communication equipment, for the possibility of activating the cellular modem on a cellular network after manufacture, shipping and/or installation of the communication equipment in the field.

A need also exists to provide flexibility to a customer of the communication equipment to change or choose the cellular network carrier without disassembly of the waterproof, sealed enclosure and/or to replace an internally located SIM card.

These and other needs are met by the weatherproof bulkhead mount of the present disclosure that includes a socket (or "connector"; in the present disclosure "socket" and "connector" are used interchangeably) for an "active" component. As used herein, the term "active" component means a component that is installed in or associated with the socket and actively participates in the function of the communication equipment. Preferably, the "active" component is a SIM card that is located in a convenient location on the surface of the weatherproof, sealed enclosure.

SUMMARY OF THE DISCLOSURE

The present disclosure relates to a weatherproof bulkhead mount for communication equipment, which mount is located in an outdoor environment and/or exposed to environmental conditions.

In one embodiment, the present disclosure provides a weatherproof bulkhead mount for mounting through a wall of a weatherproof, sealed enclosure. The mount comprising a weatherproof bulkhead housing having a first portion sized and adapted to pass through an opening in the wall to the inside of the wall and a second portion sized to remain in the outdoor environment, a connector in the housing that provides electrical connection for an active component and is accessible from the outdoor environment, a circuit board in electrical contact with the connector for providing electrical communication between the connector and inside the wall, and a removable cap that can cover the second portion and provides a weatherproof seal for the connector when covering the second portion, and provides access to the connector when not covering the second portion.

In a preferred embodiment, the present disclosure provides that the first portion comprises a locking element. Preferably, the locking element is either threads that can receive a threaded nut or a spring element that can compress to pass through the opening and expand after passing through the opening.

The present disclosure provides that the weatherproof bulkhead mount can include an "active" component connector.

In a preferred embodiment, the "active" component connector is a SIM socket or a SIM card.

The present disclosure further provides that the removable cap comprise a tethered cap having a push/pull grip, a tether, preferably an elastic tether, and a tether retaining ring. The tether retaining ring can also provide the function of a weatherproof bulkhead gasket when tightened against the weatherproof bulkhead by a fastener from the inside space of the weatherproof, sealed enclosure.

In another embodiment, the present disclosure provides for a method of inserting into and/or removing an "active" component from a weatherproof bulkhead mount. The method comprises (1) providing a weatherproof bulkhead mount for mounting through a wall of a weatherproof, sealed enclosure that can be placed in an outdoor environment the weatherproof bulkhead mount comprising: a housing having a portion sized to pass through the surface of the enclosure and a portion sized to remain on the surface of the enclosure, a connector in the housing that provides electrical connection for an active component and is accessible from the outdoor environment, a circuit board in electrical communication with the connector for providing electrical communication between the connector and the inside of the enclosure, and a removable cap that can cover the portion of the housing remaining on the surface of the enclosure, to provide access to the connector when removed and to provide a weatherproof seal for the connector when not removed, (2) removing the removable cap to provide access to the active component and the active component connector; (3) optionally removing the active component to replace the active component with another active component; and (4) replacing the removable cap to provide a weatherproof seal for the active component connector.

The above-described and other advantages and features of the present disclosure will be appreciated and understood by those skilled in the art from the following detailed description, drawings, and appended claims.

BRIEF DESCRIPTION OF THE DRAWINGS

Further advantageous features and details of the present disclosure will become apparent to those of skill in the art from the following description of the drawings, in which.

DETAILED DESCRIPTION OF A PREFERRED EMBODIMENT

Figure 1:
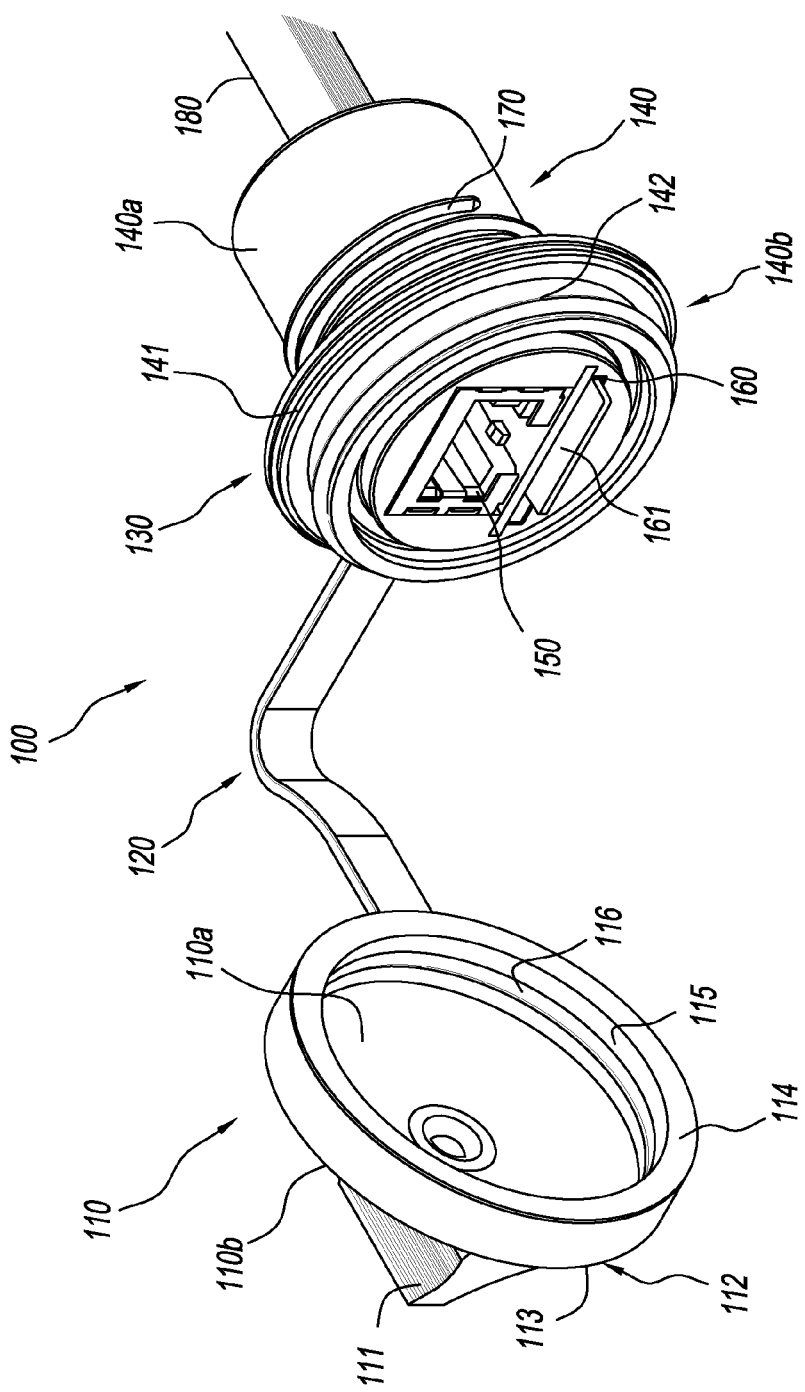
FIG. 1 is a perspective view of a weatherproof bulkhead mount of the present disclosure with a tethered cap in an open (or "off") position.
Figure 4:
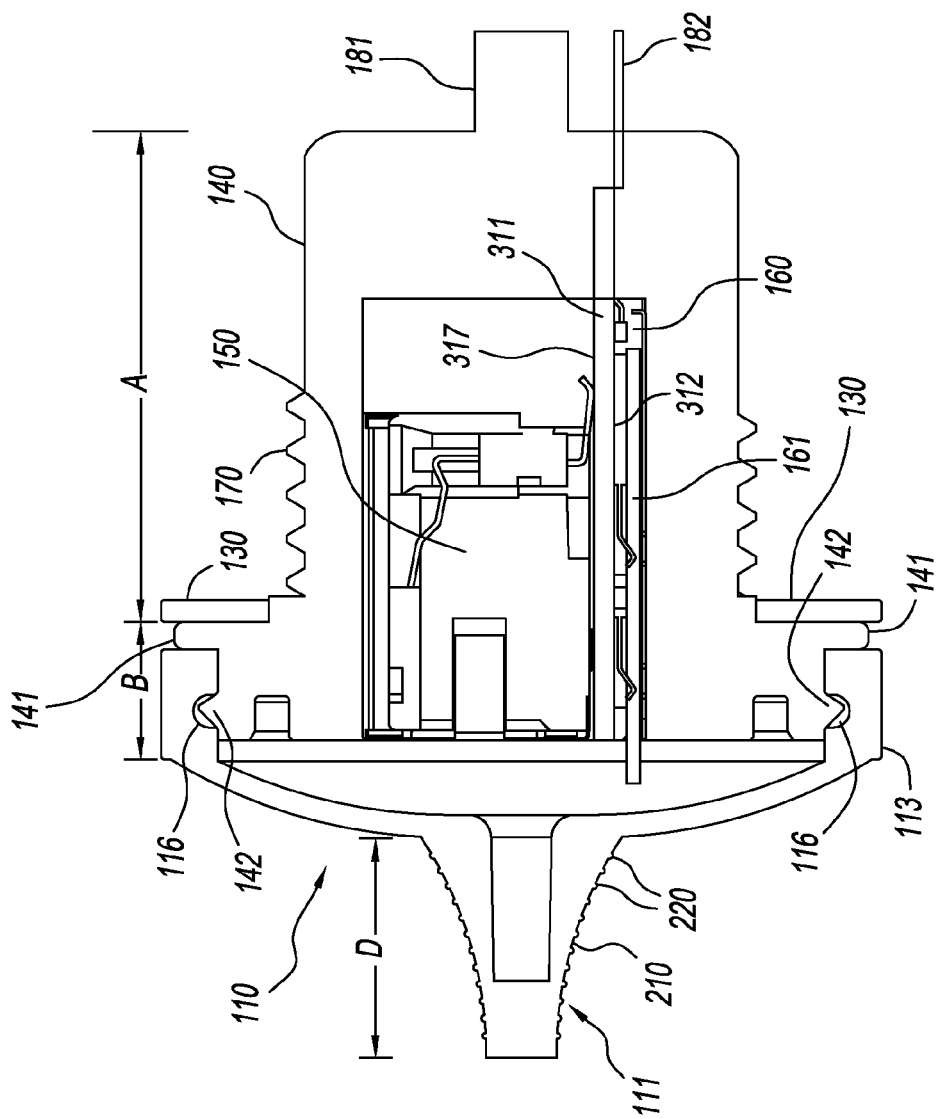
FIG. 4 is a side cross-sectional view of the weatherproof bulkhead mount of FIG. 3.

Referring to the drawings and, in particular, FIG. 1, there is shown a weatherproof bulkhead mount of the present disclosure generally represented by reference numeral 100. In weatherproof bulkhead mount 100, there is included a tethered cap 110, a tether 120 affixed to the cap 110 and positioned between the cap 110 and a tether retaining ring 130. Also shown in FIG. 1 is a bulkhead connector body 140, an inactive component socket 150 and an active component socket 160 (shown with a SIM card 161 in place in FIG. 1). As used herein, an "inactive" component socket does not have a component that actively participates in the function of the communication equipment, although the "inactive" component socket can be connected to component(s) that interact with the communication equipment, such as diagnostic equipment or for software updates. On the other hand, an "active" component socket has a component that actively participates in the function of the communication equipment such as, preferably, a SIM card. Bulkhead connector body 140 includes a portion 140a that is sized so as to fit in an opening (not shown) of a weatherproof, sealed enclosure, and a portion 140b sized so that it cannot fit in the opening (not shown) of a weatherproof, sealed enclosure into which portion 140a does fit. Portion 140a has a length generally referred to as "A" as shown in FIG. 4. On an outer perimeter of portion 140a proximal one end of length "A" is a thread 170. Projecting from another end of length "A", and generally disposed away from thread 170, is a plurality of cables 180. Portion 140b has a length "B" as shown in FIG. 4 Along a perimeter at one end of length "B" and proximal thread 170 is a flange 141. Along a perimeter proximal another end of length "B" distal thread 170 is a rim 142. Tethered cap 110 includes an inner surface 110a, an outer surface 110b, a grip 111 on outer surface 110b, a flange 112 substantially perpendicular to inner surface 110a along a perimeter of tethered cap 110, with flange 112 having an outer surface 113, an edge 114, an inner surface 115 and, on inner surface 115, a groove 116. Referring to the figures and, in particular to FIG. 1, weatherproof bulkhead mount 100 is shown in an overall generally cylindrical (or round) configuration. As a result, each of flange 112, outer surface 113, edge 114, inner surface 115 and groove 116 are shown as circular shapes. Likewise, all of bulkhead connector body 140, portion 140a, portion 140b, flange 141 and rim 142 are shown as in circular shape. Of course, as will be apparent to one of skill in the art, the configuration/shape of weatherproof bulkhead mount 100 can be any configuration/shape or combination thereof so long as the function described below is satisfied.

The weatherproof bulkhead mount of the present disclosure may include the "active" component socket alone or, preferably, the "active" component socket may be included with other components sockets, whether "active" or "inactive". Combining a plurality of component sockets in the weatherproof bulkhead mount of the present disclosure reduces the number of openings that may affect the integrity of the waterproof, sealed enclosure. Alternatively, combining a plurality of component sockets in the weatherproof bulkhead mount of the present disclosure reduces the amount of surface area required for component sockets in the same weatherproof bulkhead mount.

When there is plurality of component sockets in the weatherproof bulkhead mount of the present disclosure, the component sockets can both be in communication with a circuit board for providing communication between each component socket and the appropriate component(s) inside the weatherproof, sealed enclosure. However, each of the plurality of component sockets is functionally and electrically unrelated to another. When the "active" component comprises a SIM card in a SIM connector, the SIM card is preferably loaded into and removed from the SIM connector using a "spring-loaded" locking/release mechanism; these types of mechanisms are well-known to those of skill in the art.

Figure 2:
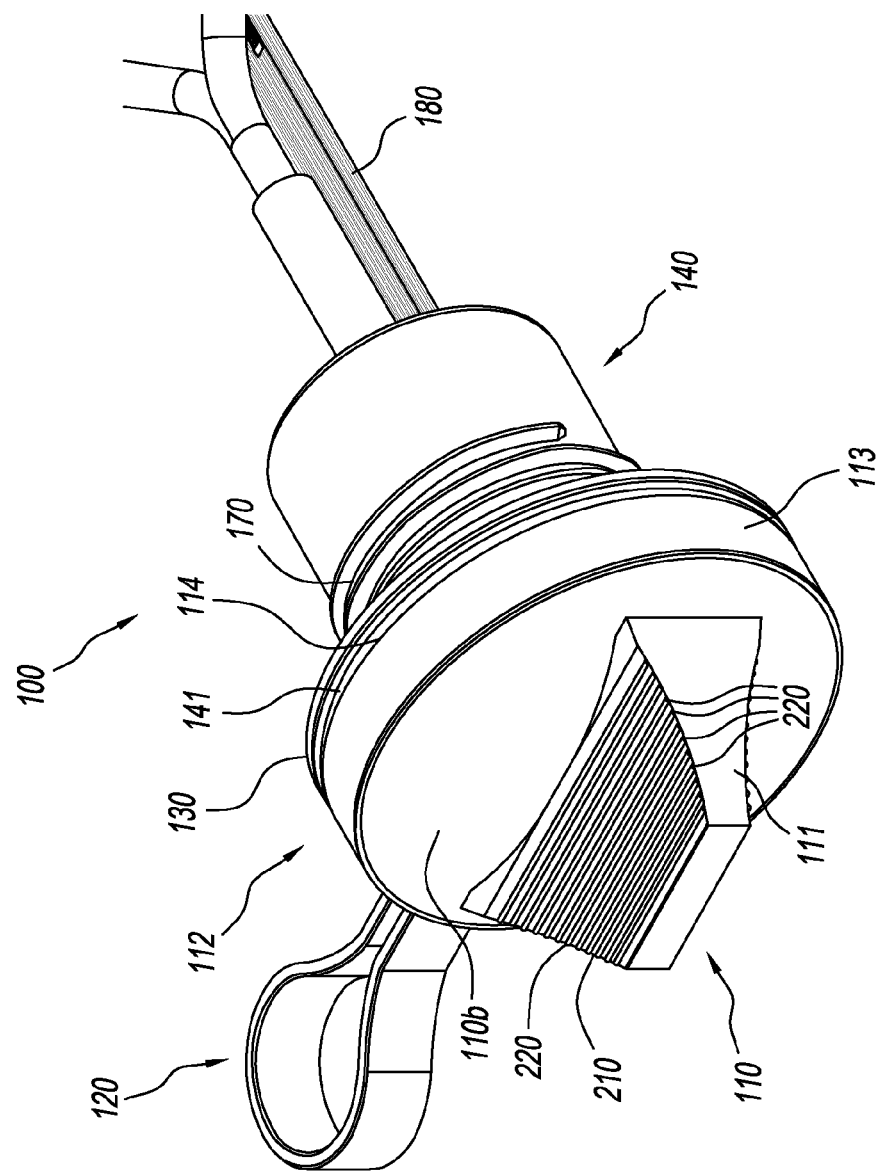
FIG. 2 is a perspective view of the weatherproof bulkhead mount of FIG. 1 with the tethered cap in a closed (or "on") position.

FIG. 2 shows weatherproof bulkhead mount 100 with tethered cap 110 in a closed position with respect to bulkhead connector body 140. Although not shown in any of the figures, in use weatherproof bulkhead mount 100 will be placed in position in a waterproof, sealed enclosure in the following manner. The waterproof, sealed enclosure (not shown) has at least one opening (not shown) that is sized to allow bulkhead connector body 140 to pass therethrough but is also sized so that tether retaining ring 130 and flange 141 will not pass therethrough. When bulkhead connector body 140 is inserted into the opening in the waterproof, sealed enclosure, tether retaining ring 130 and flange 141 abut an outer surface of the waterproof, sealed enclosure. As used herein, "an outer surface of waterproof, sealed enclosure" means a surface that is exposed to the environment. At the same time, bulkhead connector body 140 passes through an opening in the waterproof, sealed enclosure and is retained in place by, e.g., use of a nut (not shown) that mates with thread 170. As the nut is threaded onto thread 170, the nut contacts an inner surface of the waterproof, sealed enclosure and causes tether retaining ring 130 and flange 141 to be firmly and sealingly pressed against an outer surface of the waterproof, sealed enclosure. As used herein, "an inner surface of waterproof, sealed enclosure" means a surface that is not exposed to the environment. Preferably, tether retaining ring 130 is made from an elastomeric material, such that it forms a pliant and more effective seal against an outer surface of the waterproof, sealed enclosure.

Referring to FIGS. 1 and 2, tethered cap 110 in the embodiment shown provides a weatherproof seal with bulkhead connector body 140. This is accomplished by a combination of features of tethered cap 110. Flange 112 of tethered cap 110 can completely cover the portion of bulkhead connector body 140 that includes flange 141 and rim 142, so that edge 114 of flange 112 abuts the surface of flange 141 that is disposed proximal to tethered cap 110 as shown in FIG. 4. At the same time, to ensure that tethered cap 110 remains securely in position with portion 140 of bulkhead connector body 110 that includes flange 141 and rim 142, tethered cap 110 is provided with groove 116. As tethered cap 110 is seated over portion 140 of bulkhead connector body 110 that includes flange 141 and rim 142, the application of pressure causes rim 142 to pass over the leading edge of inner surface 115 and become seated in groove 116 as shown in FIG. 4.

Referring to FIGS. 1 and 2, tethered cap 110 includes grip 111. In the embodiment shown in the FIGS., grip 111 has a length "C" and a height "D". Length "C" and height "D" are provided to allow firm and easy gripping of grip 111 by a worker, even when wearing bulky electrically-protective gloves. For providing additional security for gripping, grip 111 can be provided with a grippable surface 210 covering substantially the entire dimension of length "C" and height "D" of grip 111. Grippable surface 210 has one or more features that provide additional frictional gripping ability to grip 111. As shown, grippable surface 210 has a series of substantially parallel ridges 220 substantially equally spaced along both top and bottom sides of grippable surface 210 as shown in FIG. 4. Of course, it will be appreciated by those skilled in the art that, rather than comprising a series of substantially parallel ridges 220 substantially equally spaced along both top and bottom sides of surface 210, the one or more features that provide additional frictional gripping ability to grip 111 could be single or multiple depressions in grippable surface 210 (e.g., one on the top side, and one on the bottom side) or, likewise, single or multiple protrusions on grippable surface 210. All such possibilities of providing additional frictional gripping ability to grip 111 are within the scope of the present disclosure.

Figure 3:
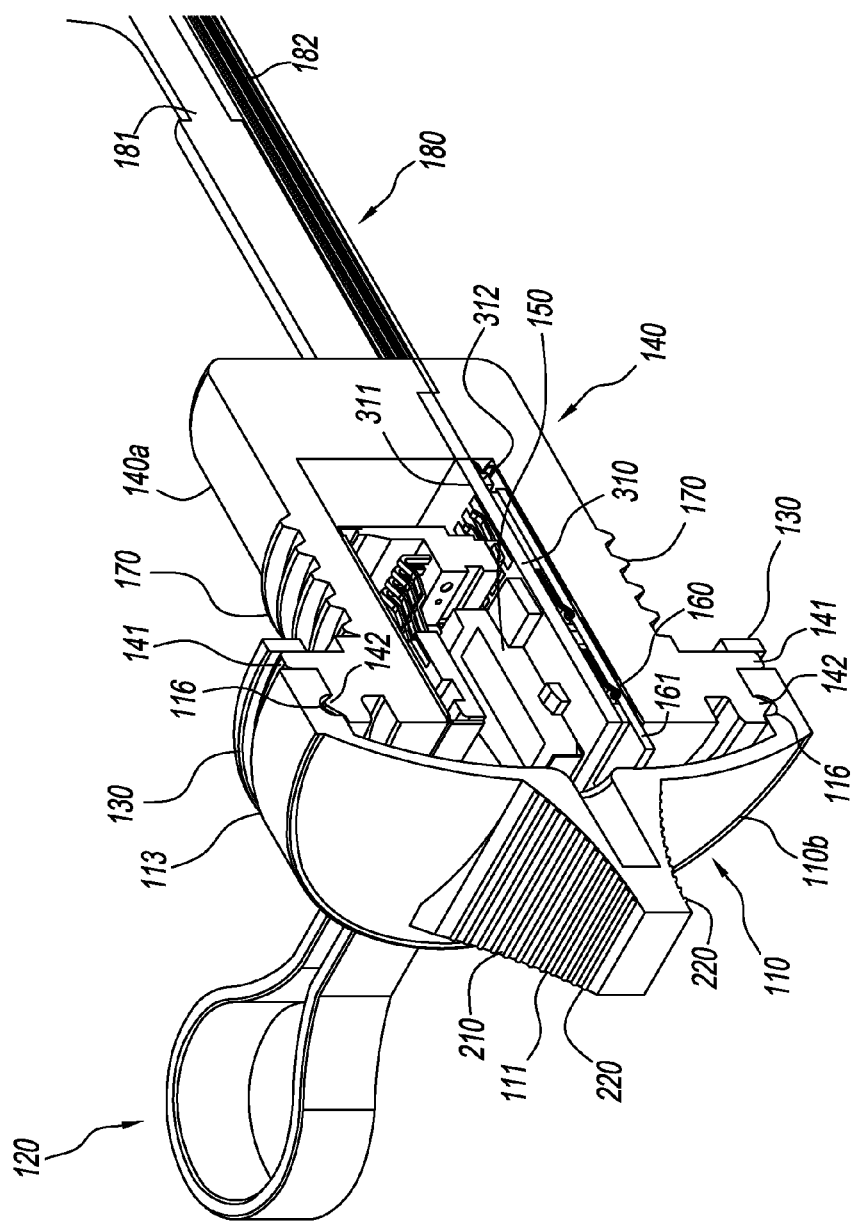
FIG. 3 is a perspective cross-sectional view of the weatherproof bulkhead mount of FIG. 2.

FIGS. 3 and 4 shows the inner mechanisms and electrical contacts of weatherproof bulkhead mount 100. A printed circuit board 310 is provided with two sides 311 and 312. Each of the two sides 311 and 312 are provided with electrical contacts that are designed and configured for providing appropriate electrical contact points for each of inactive component socket 150, and active component socket 160, so that the correct electrical communication is provided to components inside the weatherproof, sealed enclosure via appropriate cables, e.g., 181 and 182, respectively. In FIGS. 3 and 4, active component socket 160 is a SIM connector, and inactive component socket 150 is an RJ-45 connector. Of course, as mentioned above, any desired inactive connector (or plurality thereof) and/or any desired active connector (or plurality thereof) may be included in weatherproof bulkhead mount 100.

It should also be noted that the terms "first" and "second" and the like may be used herein to modify various elements. These modifiers do not imply a spatial, sequential, or hierarchical order to the modified elements unless specifically stated. Also, letters "a", "b" , and/or numbers "1", "2" and so forth do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications can be made to adapt a particular situation or material to the teachings of the present disclosure without departing from the scope thereof. Therefore, it is intended that the present disclosure not be limited to the particular embodiment(s) disclosed as the best mode contemplated, but that the present disclosure will include all embodiments falling within the scope of the appended claims.

What is claimed is:

1. A method comprising:
  providing a weatherproof bulkhead mount for mounting through a wall of a weatherproof, sealed enclosure that can be placed in an outdoor environment, the enclosure having an inside space and a surface exposed to the outdoor environment, the weatherproof bulkhead mount comprising:
    a housing having a portion sized to pass through the surface of the enclosure to the inside space and a portion sized to remain on the surface of the enclosure;
    a connector in the housing that provides electrical connection for an active component, wherein the connector is accessible from the outdoor environment;
    a circuit board in electrical communication with the connector and with a cable for providing electrical communication between the connector and the inside space; and
    a removable cap sized to cover the portion of the housing remaining on the surface of the enclosure, to provide access to the connector when removed and to provide a weatherproof seal for the connector when not removed;
  removing the removable cap to expose and provide access to the active component and the active component connector;
  optionally, removing the active component to replace the active component with another active component; and
  replacing the removable cap to provide a weatherproof seal for the active component connector.

* * * * *